United States Patent
Wingerson

(12) 
(10) Patent No.: US 6,419,788 B1
(45) Date of Patent: Jul. 16, 2002

(54) METHOD OF TREATING LIGNOCELLULOSIC BIOMASS TO PRODUCE CELLULOSE

(75) Inventor: Richard C. Wingerson, Crested Butte, CO (US)

(73) Assignee: PureVision Technology, Inc., Fort Lupton, CO (US)

(*) Notice: Subject to any disclaimer, the term of this patent is extended or adjusted under 35 U.S.C. 154(b) by 0 days.

(21) Appl. No.: 09/640,815

(22) Filed: Aug. 16, 2000

(51) Int. Cl.[7] .............................. D21C 3/00; D21C 3/02; D21C 3/26

(52) U.S. Cl. .............................. 162/14; 162/18; 162/47; 162/60; 162/63; 162/65; 162/78; 162/19; 162/90; 127/37; 426/635; 530/500; 536/56

(58) Field of Search .............................. 162/26, 14, 19, 162/16, 18, 56, 63, 47, 78, 65, 67, 60; 127/1, 37, 29; 536/56, 57; 435/101; 530/500, 501, 502, 814; 426/635

(56) References Cited

U.S. PATENT DOCUMENTS

| | | |
|---|---|---|
| 1,824,221 A | 9/1931 | Mason |
| 2,379,890 A | 7/1945 | Mason |
| 2,379,899 A | 7/1945 | Mason |
| 2,494,545 A | 1/1950 | Mason |
| 2,645,633 A | 7/1953 | Mason |
| 2,759,856 A | 8/1956 | Mason |
| 3,667,961 A | 6/1972 | Algeo |
| 4,111,743 A * | 9/1978 | Ronnholm .................... 162/47 |
| 4,136,207 A | 1/1979 | Bender |
| 4,237,226 A | 12/1980 | Grethlein |
| 4,274,911 A * | 6/1981 | Kroneld et al. ................ 162/47 |
| 4,461,648 A | 7/1984 | Foody |
| 5,125,977 A | 6/1992 | Torget et al. |
| 5,424,417 A | 6/1995 | Torget et al. |
| 5,503,996 A | 4/1996 | Torget et al. |
| 5,628,830 A | 5/1997 | Brink |
| 5,705,369 A | 1/1998 | Torget et al. |
| 5,846,787 A | 12/1998 | Ladisch et al. |
| 5,916,780 A | 6/1999 | Foody et al. |
| 5,944,950 A * | 8/1999 | Olausson et al. ............. 162/47 |
| 6,022,419 A | 2/2000 | Torget et al. |

FOREIGN PATENT DOCUMENTS

GB    2 000 822 A    1/1979

OTHER PUBLICATIONS

A C S Symposium Series 397 "Lignin Properties and Materials", Editors: Wolfgang G. Glasser and Simo Sarkanen, American Chemical Society, Washington, DC 1989, Chapter 1.

"Conversion of Biomass into Chemicals with High–Temperature Wet Oxidation", Gary D. McGinnis, Wilber W. Wilson, Shawn E. Prince, and Chyl–Cheng Chen, vol. 22, No. 4, pp. 633–636, © 1983 American Chemical Society.

"Biomass Pretreatment with Water and High–Pressure Oxygen. The Wet–Oxidation Process", Gary D. McGinnis, Wilbur W. Wilson and Cliff E.Mullen, pp. 352–357, © 1983 American Chemical Society.

(List continued on next page.)

Primary Examiner—Steve Alvo
(74) Attorney, Agent, or Firm—Hogan & Hartson, LLP

(57) ABSTRACT

A multi-function process is described for the separation of cellulose fibers from the other constituents of lignocellulosic biomass such as found in trees, grasses, agricultural waste, and waste paper with application in the preparation of feedstocks for use in the manufacture of paper, plastics, ethanol, and other chemicals. This process minimizes waste disposal problems since it uses only steam, water, and oxygen at elevated temperature in the range of 180° C. to 240° C. for 1 to 10 minutes plus a small amount of chemical reagents to maintain pH in the range 8 to 13. An energy recuperation function is important to the economic viability of the process.

23 Claims, 3 Drawing Sheets

OTHER PUBLICATIONS

"Pretreatment of Wheat Straw and Conversion of Xylose and Xylan to Ethanol by Thermophilic Anaerobic Bacteria", B. K. Ahring, K. Jensen, P. Nielsen, A. B. Bjerre and A. S. Schmidt, © 1997 Elsevier Science Limited, pp. 107–113.

"Decomposition of Polyolefins and Higher Paraffins by Wet Oxidation", Anne Belinda Bjerre and Emil Sorensen, © 1994 American Chemical Society, pp. 736–739.

"Pretreatment of Wheat Straw Using Combined Wet Oxidation and Alkaline Hydrolysis Resulting in Convertible Cellulose and Hemicellulose", Anne Belinda Bjerre, Anne Bjerring Olesen, Tomas Fernqvist, Annette Ploger, and Annette Skammelsen Schmidt, Biotechnology and Bioengineering, vol. 49, pp. 568–577 (1996), © 1996 John Wiley & Sons, Inc.

"Optimization of Wet Oxidation Pretreatment of What Straw", Annette Skammelsen Schmidt and Anne Belinda Thomsen, Bioresource Technology 64 (1998) pp. 139–151, © 1998 Elsevier Science Ltd.

"Mild alkaline/oxidative pretreatment of wheat straw", Nicoletta Curreli, M. Benedetta Fadda, Antoniio Rescigno, Andrea C. Rinaldi, Giulia Soddu, Francesca Sollai, Stefano Vaccargiu, Enrico Sanjust and Augusto Rinaldi, Process Biochemistry vol. 32, No. 8, pp. 665–670, 1997, © 1997 Elsevier Science Ltd.

The use of enzyme recycling and the influence of sugar accumulation on cellulose hydrolysis by Trichoderma cellulases, L. P. Ramos, C. Breuil and J. N. Saddler, Enzyme Microb. Technol., 1993, vol. 15, pp. 19–25, Jan., © 1993 Butterworth–Heinemann.

"Fractionation of *Populus tremuloides* at the Pilot Plant Scale: Optimization of Steam Pretreatment Conditions using the STAKE II Technology", M. Heitz, E. Capek–Menard, P. G. Koeberle, J. Gagne, E. Chornet, R. P. Overend, J. D. Taylor & E. Yu, Bioresources Technology, pp. 23–32, © 1991 Elsevier Science Publisher Ltd.

"Ethanol Production from Lignocellulosics: Large Scale Experimentation and Economics", D. Ballerini, J. P. Desmarquest, J. Pourquie, F. Nativel & M. Rebeller, Bioresources Technology 50 (1994) 17–23, © 1995 Elsevier Science Limited.

"Extraction of Hemicelluloses from Poplar, Populus Tremuloides, Using an Extruder–Type Twin–Screw Reactor: A Feasibility Study", S. N.'Diaye, L. Rigal, P. Larocque and P. F. Vidal, Bioresource Technology 57 (1996) pp. 61–67, © 1996 Elsevier Science Limited.

* cited by examiner

METHOD OF TREATING LIGNOCELLULOSIC BIOMASS TO PRODUCE CELLULOSE

FIELD OF THE INVENTION

This invention relates to the production of cellulose from lignocellulosic biomass, and in particular to process whereby cellulose is separated from other constituents of lignocellulosic biomass so as to make the cellulose available as a chemical feedstock and/or accessible to enzymatic hydrolysis for conversion to sugar.

BACKGROUND OF THE INVENTION

The possibility of producing sugar and other products from cellulose has received much attention. This attention is due to the availability of large amounts of cellulosic feedstock, the need to minimize burning or landfilling of waste cellulosic materials, and the usefulness of sugar and cellulose as raw materials substituting for oil-based products.

Natural cellulosic feedstocks typically are referred to as "biomass". Many types of biomass, including wood, paper, agricultural residues, herbaceous crops, and municipal and industrial solid wastes, have been considered as feedstocks. These biomass materials primarily consist of cellulose, hemicellulose, and lignin bound together in a complex gel structure along with small quantities of extractives, pectins, proteins, and ash. Due to the complex chemical structure of the biomass material, microorganisms and enzymes cannot effectively attack the cellulose without prior treatment because the cellulose is highly inaccessible to enzymes or bacteria. This inaccessibility is illustrated by the inability of cattle to digest wood with its high lignin content even though they can digest cellulose from such material as grass. Successful commercial use of biomass as a chemical feedstock depends on the separation of cellulose from other constituents.

The separation of cellulose from other biomass constituents remains problematic, in part because the chemical structure of lignocellulosic biomass is not yet well understood. See, e.g., ACS Symposium Series 397, "Lignin, Properties and Materials", edited by W. G. Glasser and S Sarkanen, published by the American Chemical Society, 1989, which includes the statement that "[l]ignin in the true middle lamella of wood is a random three-dimensional network polymer comprised of phenylpropane monomers linked together in different ways. Lignin in the secondary wall is a nonrandom two-dimensional network polymer. The chemical structure of the monomers and linkages which constitute these networks differ in different morphological regions (middle lamella vs. secondary wall), different types of cell (vessels vs. fibers), and different types of wood (softwoods vs. hardwoods). When wood is delignified, the properties of the macromolecules made soluble reflect the properties of the network from which they are derived."

The separation of cellulose from other biomass constituents is further complicated by the fact that lignin is intertwined and linked in various ways with cellulose and hemicellulose. In this complex system, it is not surprising that the "severity index" commonly used in data correlation and briefly described below, can be misleading. This index has a theoretical basis for chemical reactions (such as hydrolysis) involving covalent linkages. In lignocellulose, however, there are believed to be four different mechanisms of non-covalent molecular association contributing to the structure: hydrogen bonding, stereoregular association, lyophobic bonding, and charge transfer bonding. Bonding occurs both within and between components. As temperature is increased, bonds of different types and at different locations in the polymeric structure will progressively "melt", thereby disrupting the structure and mobilizing the monomers and macro-molecules.

Many of these reactions are reversible, and on cooling, re-polymerization can occur with deposits in different forms and in different locations from their origins. This deposition is a common feature of various conventional high temperature cellulosic biomass separation techniques. Furthermore, at higher temperatures in acid environments, mobilization of lignin is in competition with polymer degradation through hydrolysis and decomposition impacting all lignocellulosic components. As a result, much effort has been expended to devise "optimum" conditions of time and temperature that maximize the yield of particular desired products. These efforts have met with only limited success.

Known techniques for the conversion of biomass directly to sugar or other chemicals include concentrated acid hydrolysis, weak acid hydrolysis and pyrolysis processes. These processes are not known to have been demonstrated as feasible at commercial scale under current economic conditions or produce cellulose as either a final or intermediate product.

Conventional processes for separation of cellulose from other biomass components include processes used in papermaking such as the alkaline kraft process most commonly used in the United States and the sulphite pulping process most commonly used in central Europe. There are additional processes to remove the last traces of lignin from the cellulose pulp. This is referred to as "bleaching" and a common treatment uses a mixture of hot lye and hydrogen peroxide. These technologies are well established and economic for paper making purposes, but have come under criticism recently because of environmental concerns over noxious and toxic wastes. These technologies are also believed to be too expensive for use in production of cellulose for use as chemical raw material for low value products.

The use of organic solvents in cellulose production has recently been commercialized. These processes also are expensive and intended for production of paper pulp.

Many treatments have been investigated which involve preparating crude cellulose at elevated temperature for enzymatic hydrolysis to sugar. Investigators have distinguished particular process variations by such names as "steam explosion", "steam cooking", "pressure cooking in water", "weak acid hydrolysis", "liquid hot water pretreatment", and "hydrothermal treatment". The common feature of these processes is wet cooking at elevated temperature and pressure in order to render the cellulosic component of the biomass more accessible to enzymatic attack. In recent research, the importance of lignin and hemicellulose to accessibility has been recognized.

Steam cooking procedures typically involve the use of pressure of saturated steam in a reactor vessel in a well-defined relationship with temperature. Because an inverse relationship generally exists between cooking time and temperature, when a pressure range is stated in conjunction with a range of cooking times, the shorter times are associated with the higher pressures (and temperatures), and the longer times with the lower pressures. As an aid in interpreting and presenting data from steam cooking, a "severity index" has been widely adopted and is defined as the product of treatment time and an exponential function of temperature that doubles for every 10° C. rise in temperature. This function has a value of 1 at 10° C.

It is known that steam cooking changes the properties of lignocellulosic materials. Work on steam cooking of hardwoods by Mason is described in U.S. Pat. Nos. 1,824,221; 2,645,633; 2,294,545; 2,379,899; 2,379,890; and 2,759,856. These patents disclose an initial slow cooking at low temperatures to glassify the lignin, followed by a very rapid pressure rise and quick release. Pressurized material is blown from a reactor through a die (hence "steam explosion"), causing defibration of the wood. This results in the "fluffy", fibrous material commonly used in the manufacture of Masonite™ boards and Cellote™ insulation.

More recent research in steam cooking under various conditions has centered on breaking down the fiber structure so as to increase the cellulose accessibility. One such pretreatment involves an acidified "steam explosion" followed by chemical washing. This treatment may be characterized as a variant of the weak acid hydrolysis process in which partial hydrolysis occurs during pretreatment and the hydrolysis is completed enzymatically downstream. One criticism of this technique is that the separation of cellulose from lignin is incomplete. This makes the process only partially effective in improving the accessibility of the cellulose to enzymatic attack. Incomplete separation of cellulose from lignin is believed to characterize all steam cooking processes disclosed in prior art.

Advanced work with steam cooking in the United States has been carried out at the National Renewable Energy Laboratory in Golden, Colorado. U.S. Pat. Nos. 5,125,977; 5,424,417; 5,503,996; 5,705,369; and 6,022,419 to Torget, et al. incorporated herein by reference, involve the minimization of acid required in the production of sugar from cellulose by acid hydrolysis in processes that may also include the use of cellulase enzymes. These patents teach the use of an acid wash of solids in the reaction chamber at the elevated temperature and pressure conditions where hemicellulose and lignin are better decomposed and mobilized. The use of acid is tied to the goal of sugar production by hydrolysis. The focus of Torget's work appears to be acid treatments and hydrolysis and does not claim to produce high purity cellulose that is a principal objective of the present invention.

A common feature of acid hydrolysis, acid pretreatment, and chemical paper pulping is the generation of large quantities of waste chemicals that require environmentally acceptable disposal. One proposed means of waste disposal is as a marketable byproduct. Thus wallboard has been suggested as a potential use for the large quantities of gypsum produced in acid hydrolysis and acid pretreatment. This potential market is believed illusory since the market for cheap sugar is so vast that any significant byproduct will quickly saturate its more limited market.

There remains a pressing need for a process to provide low cost cellulose for subsequent conversion to glucose sugar by enzymatic hydrolysis. However, the presence of lignin in cellulosic biomass increases dramatically the amount of enzyme needed, thereby imposing unacceptably high conversion costs. Economics demand a process by which substantially pure cellulose can be produced for only a few cents per pound. Mainstream scientific and engineering efforts to utilize lignocellulosic biomass have been unable to achieve this goal over several decades. The challenge is to find a process that solves or avoids the problems of cost, chemical wastes, the clean separation of lignocellulosic components, and the unwanted degradation of said components.

Ignored by the mainstream effort is a process referred to as "wet oxidation". This is a mature technology used for the disposal of liquid and toxic organic wastes. The process involves exposing a slurry of organic material to oxygen at elevated temperature and pressure even higher than that used in steam cooking. The result is destruction of the organic material and its conversion to carbon dioxide and water. While the effectiveness of wet oxidation in the chemical modification of organic matter has been demonstrated at commercial scale, the severity of chemical breakdown in waste disposal applications leaves few useful products.

The use of wet oxidation in the pretreatment of lignocellulosic biomass is known. In one described process, wet oxidation occurs at relatively low temperatures (40° C.) and extends over 2 days. In other uses of wet oxidation in the pretreatment of lignocellulosic biomass, there is no control of pH, so acids formed in the process essentially create a variant of the mild acid pretreatment process.

In other wet oxidation work with wheat straw to recover hydrolyzed hemicellulose, process temperatures were maintained from 150° to 200° C. and pH was maintained at above 5 with sodium carbonate. Lower pHs were avoided to minimize decomposition and the formation of chemicals toxic in downstream processes. The separation of cellulose from lignin was not a stated goal in this work, and it is believed that the chemical conditions were not appropriate for such a separation. Perhaps the greatest deficiency of this work is that the entire biomass was subjected to the same treatment for the entire processing time. Thus a compromise was needed with consideration given to both the most reactive and the least reactive components. The resulting "optimized" procedure fails to satisfy the requirements for commercialization because of component degradation and low yields.

Thus it can be seen that neither technologies for paper making, for acidified steam cooking, nor for wet oxidation as presently practiced can fill the need for commercially economical techniques for preparation of high purity cellulose from cellulosic biomass which do not produce objectionable waste streams.

OBJECTS OF THE PRESENT INVENTION

Accordingly, one object of the present invention is to provide a lower cost and environmentally benign process for the separation of cellulose from other constituents of cellulosic biomass.

Another object of this invention is to produce at high yield and in a chemically active state cellulose that is substantially free of lignin, hemicellulose, and extractives that are other constituents of biomass.

SUMMARY OF THE INVENTION

According to the present invention, it has been found that relatively pure cellulose can be produced if lignocellulosic materials first are treated with steam to partially hydrolyze the hemicellulose to soluble oligomers and then are washed with alkaline hot water containing dissolved oxygen to remove these hydrolysis products and to decompose, mobilize and remove lignin, extractives, and residual hemicellulose.

A preferred method of the present invention involves the production of purified cellulose containing less than 20% lignin by chemical alteration and washing of lignocellulosic biomass material under elevated pressure and temperature. The method includes the steps of providing a lignocellulosic feedstock having an average constituent thickness of at most 1", (most preferably up to ⅛" thick), introducing the feedstock into a pressure vessel having at least two reaction zones, heating the feedstock in a first reaction zone to a temperature of from about 180° C. to about 240° C., transferring said heated feedstock from said first reaction zone to said second reaction zone while subjecting said feedstock to an oxidizing counterflow of hot wash water of pH from about 8 pH to about 13 pH to create a residual solid containing cellulose and a filtered wash water containing dissolved materials.

Optimum operating conditions depend somewhat on the type of biomass being treated, with process times being about 1 to 10 minutes and the weight of wash water used being about 2 to 20 times the dry weight of feedstock. In addition to an oxidizer, chemicals must be introduced as necessary to maintain a pH between about 8 and 13 in various reaction zones.

DESCRIPTION OF THE PREFERRED EMBODIMENT

The present invention relates to a technique in which relatively pure cellulose is produced from lignocellulosic materials which are treated with steam to partially hydrolyze the hemicellulose to soluble oligomers and then washed with a counter current flow of alkaline hot water containing dissolved oxygen to remove these hydrolysis products and to decompose, mobilize and remove lignin, extractives, and residual hemicellulose. In a preferred embodiment, a method of the present invention involves the production of purified cellulose containing less than 20% lignin by chemical alteration and washing of lignocellulosic biomass material under elevated pressure and temperature. The method includes the steps of providing a lignocellulosic feedstock having an average constituent thickness of at most 1", (most preferably up to ⅛" thick), introducing said feedstock into a pressure vessel having at least two reaction zones, heating said feedstock in said first reaction zone to a temperature of from about 180° C. to about 240° C., transferring said heated feedstock from said first reaction zone to said second reaction zone while subjecting said feedstock to a counterflow of hot, alkaline wash water from about 8 pH to about 13 pH to create a residual solid containing cellulose and a filtered wash water containing dissolved materials.

More particularly, the preferred feedstock is sawmill waste in the Pacific Northwest consisting of sawdust, bark, chips, hog material, and the like. It should be understood, however, that the techniques of the present invention are effective on a broad range of lignocellulosic materials including but not limited to wood, grass, herbacious crops, agricultural waste, waste paper, high cellulosic industrial solid waste and municipal solid waste.

Figure 1:
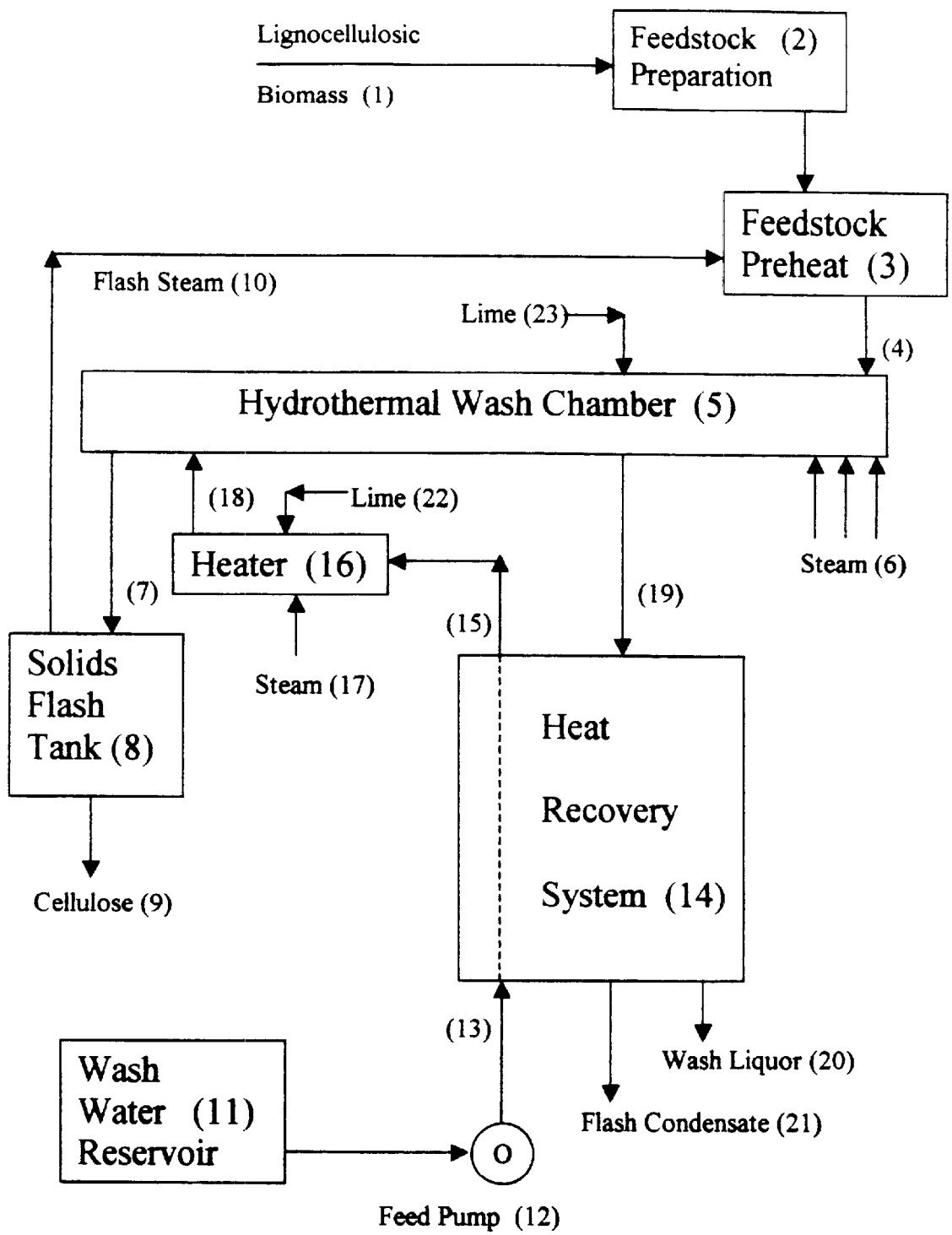
FIG. 1 s a schematic illustrating a continuous system incorporating the techniques of the present invention in the production of cellulose from lignocellulosic biomass.

The operation of a system in which the present invention may be practiced is shown in FIG. 1. Lignocellulosic biomass feedstock (1) is subjected to a preliminary preparation (2) as required by the particular nature of the feedstock. In the case of moist sawdust, for example, no preparation of any kind might be needed. In the case of municipal solid waste, a materials recycling facility may be the source of a feedstock stream substantially free of extraneous materials. The preferred average constituent thickness of the feedstock material is at most 1" in thickness. Constituent size is controlled by mechanical treatment of the feedstock material by chipping, grinding, milling, shredding or other means. The most preferred average constituent size is not greater than about ⅛" thick by 1" in other dimensions. For sawmill waste, a conventional chipper provides adequate size reduction.

The prepared feedstock is next preheated (3) by steam and forced mechanically (4) into the hydrothermal wash chamber (5) where it is further heated by steam injection (6) to a temperature of about 220° C. and a pressure of about 340 psia. As solids pass through the wash chamber, lignin and hemicellulose are mobilized and separated from the cellulose. The cellulose is discharged from the wash chamber at (7) into the flash tank (8) and delivered as product (9). Steam generated in the flash cooling (10) is recycled to preheat the solids feed.

Wash water from a reservoir (11) is pumped (12) into the heat recovery system (14) where it is preheated before entering the heater (16) where alkali (22) and steam (17) are injected to raise the temperature to about 220° C. for injection into the hydrothermal wash chamber (5) at (18). This hot, pressurized wash water flows counter to the movement of solids, collecting lignin and hemicellulose and leaving the wash chamber at (19) where it passes through the heat recovery system to provide preheat for the wash water. The weight of wash water used typically will be about 5 times the dry weight of feedstock.

The process of this invention requires that the wash water be alkaline. This is accomplished by adding lime at (22) in sufficient quantity to provide near saturation. This will require about 0.3 kgm of lime per metric ton of wash water. In addition, lime will be consumed in neutralizing acids that may be formed by oxidation. An additional kgm or more of lime per dry metric ton of feed may need to be introduced as a slurry at (23). The auger action mixes the lime with the feed to be consumed as needed in the process. The precise amount to be added will depend, in part, on the nature of the feedstock. The cellulose product must be monitored to insure that little or no lime carries through the process, and the wash liquor must be monitored to insure that a pH of at least 11 is maintained. The flow of lime slurry is then adjusted to meet these two requirements.

Figure 2:
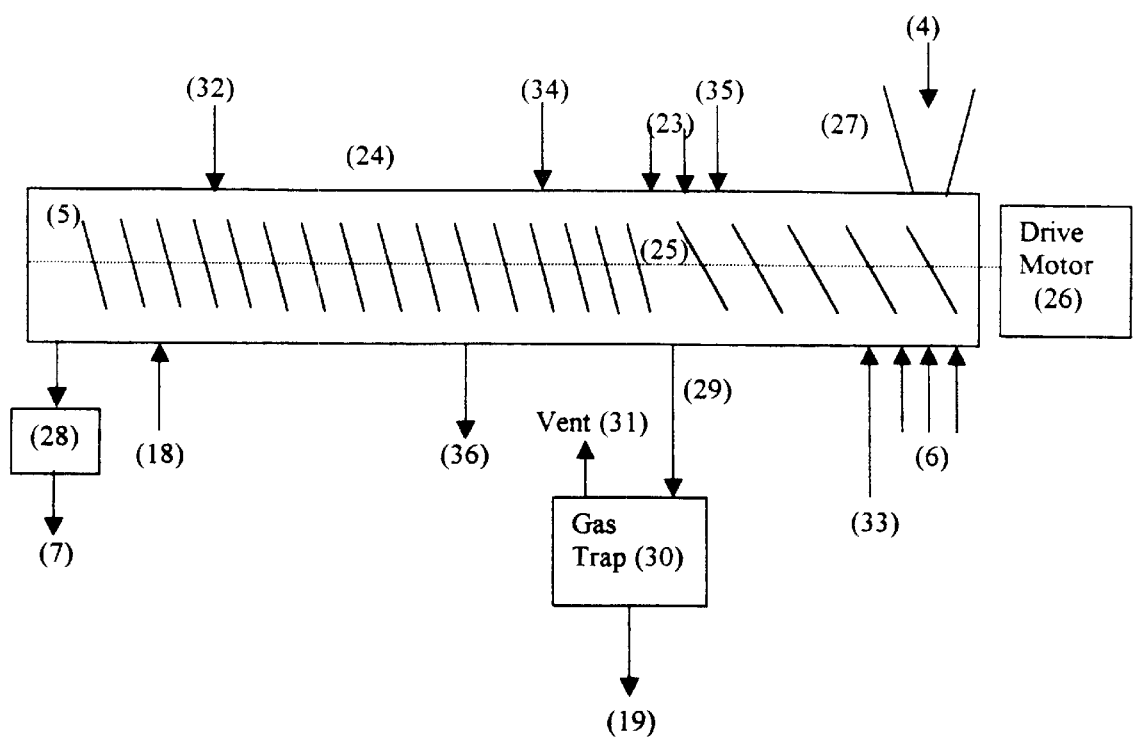
FIG. 2 is a section view illustrating details of the operation of the hydrothermal wash chamber of FIG. 1.

FIG. 2 illustrates operation of the hydrothermal wash chamber in more detail. This apparatus consists of a cylindrical pressure vessel (24) containing a rotal auger (25) driven by a motor (26). Provision is made for forced insertion of solid material (4) at (27) and for intermittent discharge of solids (7) through a ball valve (28). The insertion and release of solids is accomplished without significant loss of chamber pressure. This entire apparatus, known as STAKE II, is commercially available from Stake Technology, Ltd., a Canadian corporation, and can be sized for any application. Functionally equivalent apparatus is available elsewhere and is in common use in the paper industry. Some such apparatus may employ twin screws either co-rotating or counter-rotating. For the present application, the standard STAKE II design is modified by the manufacturer to include a screw having interruptions and/or different pitch on the two ends (to accommodate the dissolving of a portion of the feed) and having ports for the injection and discharge of pressurized liquid. Auger action compacts solids at the discharge end to minimize loss of wash water during solids release. The auger action also subjects solids to shearing forces. As material dissolves, the remaining solid is weakened, and the shear forces break up the larger pieces, expose more surface area, and so facilitate further dissolution.

In the preferred implementation, pressurized wash water is injected at (27) and exits at (29) to a gas trap (30) where air trapped in the feed and gasses introduced or released in the processing can be vented (31). The wash liquor containing dissolved lignin and hemicellulose then continues its flow under pressure at (19). It is necessary that the drain (29) be equipped with a filter in the wall of the wash chamber to prevent solids from escaping. The fresh solids are driven by the auger at close spacing to scour the filter and prevent the buildup of fines that could cause clogging.

An important feature of the process of the present invention is the control of pH. Either acid or base can catalyze hydrolysis and other irreversible chemical reactions. As steam (6) heats the fresh solids, acetic acid is released from degradation of the hemicellulose and can reduce the pH to as low as 3. In the preferred implementation, this acidity auto-catalyzes the hydrolysis of some hemicellulose to soluble oligomers. The goal is to hydrolyze the hemicellulose and then quickly to raise the pH and wash the resulting oligomers out of the chamber at (29) in order to prevent further degradation. The hemicellulose spends not more than about 30 to 60 seconds in the wash chamber, and during this brief time, the steam has little effect on the lignin and cellulose. As a variation on this procedure, steam injected at (6) might raise the temperature to as little as 180° C. for a more extended time to hydrolyze hemicellulose after which additional steam injected at (35) could further increase the temperature to dissolve lignin.

In the wash zone between (18) and (29), the goals are first to maintain alkaline conditions in order to prevent hydrolysis of cellulose, prevent condensation of lignin, and promote dissolution of the lignin and wash it away. To maintain a proper pH, lime or other base is injected with the wash water (18) and in a slurry at (23). At (23) the lime is injected both before and after the liquid discharge at (29) in order to avoid waste. The flow (23) just before (29) is adjusted to the minimum required to neutralize acids formed in zone one and to raise the pH to about 11 or 12. The flow (23) just after (29) should be sufficient to neutralize all acids formed in the following zone(s).

In other implementations, more complex wash patterns may be employed such as feeding wash water at (18) with an exit at (36) to remove lignin while providing a second feed of wash water at (35) with exit at (29) to remove hemicellulose. Interruption of the screw between (36) and (29) and perhaps modifying the cross section of the wash chamber wall could then provide a moving barrier of compacted solids to minimize mixing of liquids. The common innovation in all implementations of the present invention is the washing of cellulose solids at high temperature and pressure under alkaline conditions that minimize undesirable chemical degradation.

Oxygen is injected in controlled amounts and at controlled pressure at positions (32) and (34) and at intervening position (not shown) as required, depending on apparatus size and other factors. In the preferred implementation, at least 3 kgm of oxygen may be required for each dry metric ton of feed. The total reaction time depends on the speed of the auger drive motor (26) and will be between 2 and 4 minutes in the preferred implementation. Motor speed, temperature, water wash, and oxygen flow rate can be adjusted to optimize cellulose production.

Figure 3:
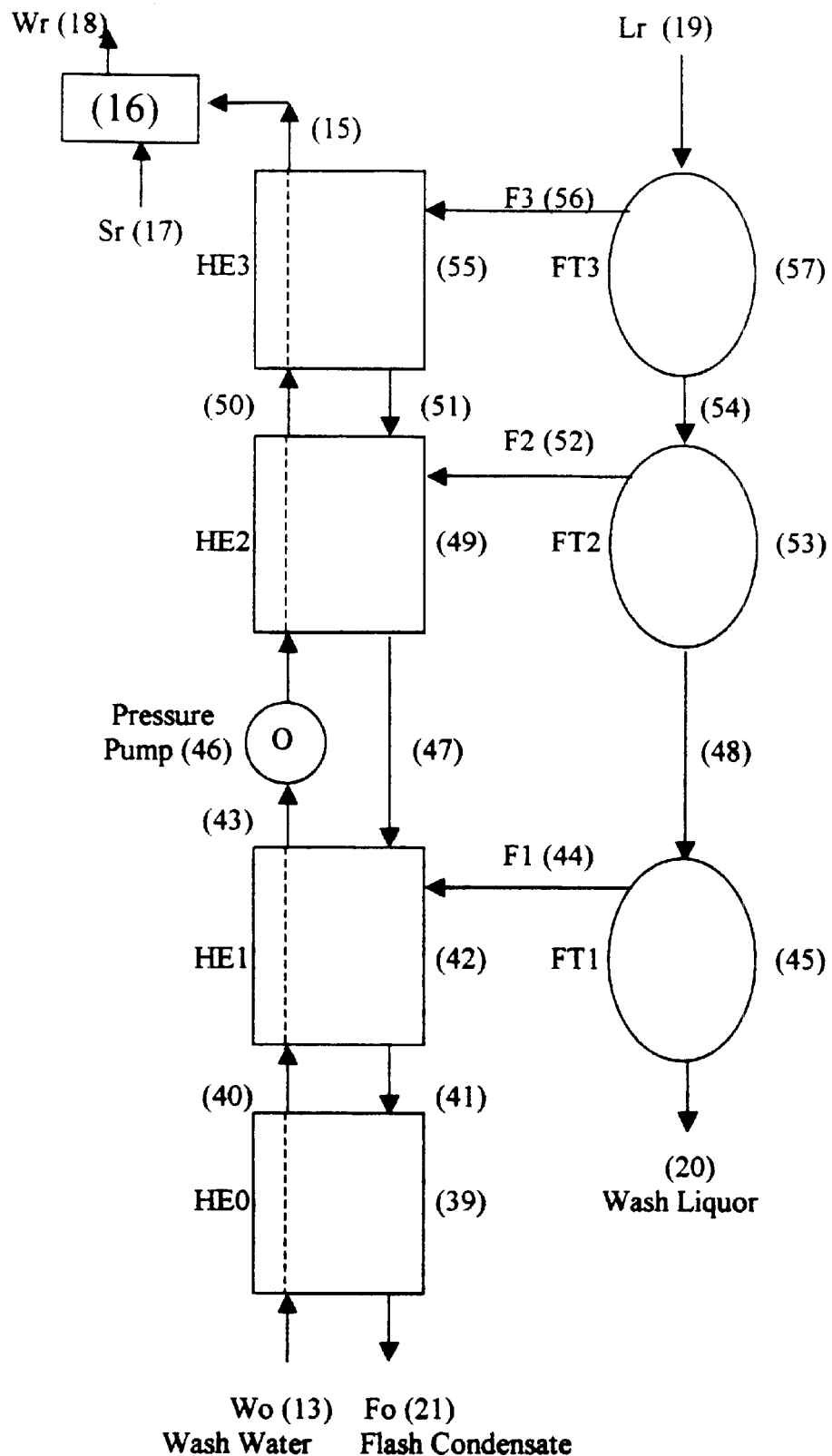
FIG. 3 is a section view illustrating portions of a heat recuperation subsystem of FIG. 1.

Heating large volumes of wash water to high temperatures is energy intensive. FIG. 3 illustrates an energy conservation feature. Wash liquor carrying dissolved solids from the wash chamber is discharged (19) to a chain of flash tanks (57), (53), (45) for stepwise reduction of pressure to atmospheric. Each flash tank is paired with a condensing heat exchanger (55), (49), (42) that is part of a chain to preheat the wash water to the wash chamber. Flash cooling of liquid (19), (54), (48) entering each flash tank generates steam (56), (52), (44) that flows to the heat exchangers where it condenses. This condensed liquid (51), (47) is then flashed to the next heat exchanger in the chain. Thus the total wash liquor plus flash liquor being flash cooled at each stage remains constant. Flash tanks are of a standard design, and heat exchangers are of standard design—all apparatus sized for the particular application and rated for the required pressure.

The heat of the final condensed flash liquor (41) at about 100° C. is used entirely or in part to preheat wash water in the liquid-liquid heat exchanger (39). This flash condensate may contain some volatile chemicals but is not particularly corrosive.

To insure proper operation, pressure in the flash tanks is controlled with a control system in which the measured pressure and/or temperatures in the various flash tanks and heat exchangers are used to regulate variable nozzles that admit liquid continuously to the tanks.

Wash water (13) from the feed pump (12) flows through heat exchangers (39) and (42) that operate near atmospheric pressure at temperatures below 100 degrees C. Pressure pump (46) then increases pressure to that required for the hydrothermal wash—about 450 psia in the preferred embodiment. The wash water continues its flow through heat exchangers (49) and (55) to the final heater (16) where it is brought to final temperature by steam injection (17). When three stages of flash cooling are used as shown, the wash water heating requirement is reduced by over 75%. If an additional stage of flash cooling with heat exchanger is added between (53) and (57) the wash water heating requirement is reduced by over 80%. The choice of the number of flash cooling stages to be used in any application involves the balancing of capital and operating costs.

More particularly, optimal energy recycle depends on a number of factors that translate ultimately to a sequence of operating pressures for the flash tanks. Factors that must be considered include: composition of the solid feed material to the cellulose recovery process including moisture content, temperature of this feed, processing temperature, dilution of dissolved solids, moisture content of discharged cellulose, and temperature drop across the heat exchangers. In the course of computation it is generally found that the flow of effluent wash water is not the same as the input of fresh wash water since moisture from the solids feed and from steam condensate has been added and moisture in the cellulose output has been subtracted. In addition, there are the dissolved solids to consider. Because of all these dependencies, an automated system is needed for minute by minute heat exchanger control, but set points need first to be calculated in setting up the system.

Calculation begins with mass balances for the hydrothermal wash chamber. With reference to FIG. 3, let the flow of fresh wash water into the reaction chamber at (18) be Wr and the flow of wash liquor with dissolved solids out of the reaction chamber at (19) be Lr. The ratio of these two flows is an important determinant of the flash tank pressures, so define R=Wr/Lr. Values for Wr, Lr, and R must be calculated from the operational requirements of the process application. Thus start with the feed rate of solid material, its temperature, and its composition, consider the steam flow required to heat to operating temperature, consider the portion of the feed that will be dissolved, consider the moisture content of the solids to be discharged, and consider the allowable concentration of dissolved solids in the effluent wash liquor. With knowledge of the heat capacities of the various materials and by use of a set of steam tables the necessary calculations can be performed. For fresh sawmill waste in the Pacific Northwest the result will be R=0.8 more or less.

For initial process design purposes, an approximate calculation can be done to determine stage temperatures and mass flows. Consider the liquid flow, Lr, at temperature, Tr, with enthalpy Hr at (19) in FIG. 3. This liquid is to be cooled to temperature, T3, and enthalpy H3 in flash tank FT3 (57). The enthalpy change will be Lr*(Hr-H3). This excess heat will flash part of the liquid to steam with an enthalpy change from liquid to vapor given by F3*Hlv3=Lr*(Hr-H3) where F3 is the rate of steam flow at (56). This flash steam will pass to the heat exchanger HE3 (55) where it will be condensed and give up its heat to the fresh wash water Wo (13): Wo*(H3-H2)=F3*Hlv3. Similar relationships can be written for all stages. For ease of calculation, liquid enthalpies in Btu/pound can be expressed approximately as H=1.8*T degrees C. It is also convenient to normalize mass flows with respect to the fresh wash water feed, Wo, so that L=Lr/Wo, S=SrWo, W=Wr/Wo, fs=Fs/Wo where "s" is stage number. Thus a set of equations can be written to describe the heat exchange process: Steam Input:

$$W = 1 + S \quad (50)$$

$$S*Hlvr = 1.8*(Tr - T3 + D) \quad (51)$$

where "D" is the temperature drop across any heat exchanger.

Stage 1:

$$T2 - T1 = (T1 - To)/L \quad (52)$$

$$f1*Hlv1 = L*1.8*(T2 - T1) \quad (53)$$

Stage 2:

$$T3 - T2 = (T2 - T1)/L \quad (54)$$

$$f2*Hlv2 = L*1.8*(T3 - T2) \quad (55)$$

Stage 3:

$$Tr - T3 = (T3 - T2)/L \quad (56)$$

$$f3*Hlv3 = L*1.8*(Tr - T3) \quad (57)$$

The pattern can be extended to any number of stages, from which:

$$S = W - 1 = L*R - 1 \quad (58)$$

$$D = (Hlvr*S)/1.8 - (Tr - T1)*(L - 1)/(L_n - 1) \quad (59)$$

$$T1 - To = (Tr - T1)*(L - 1)1(1 - L_{-n}) \quad (60)$$

Where: n=3 is the number of stages in the preferred implementation.

Computation is facilitated if a certain sequence is followed: First, set the reactor temperature, Tr, and the temperature of the first stage, T1=100. With Tr, T1, and R specified pick a trial value for L>1 from which get S (58) and D (59). Adjust L until the value for D is acceptable—usually about 10. Then calculate (T1-To) (60), (T2-T1) (52), (T3-T2) (54), etc. through all stages. Obtain values for the liquid-to-vapor enthalpy changes, Hlv, from steam tables and calculate f1, f2, f3, etc. through all stages and sum for the total flash liquor of. From the mass balance on the wash chamber, Lr will be known, so use Wo=Lr/L to remove the normalization from mass flows for steam and liquids. With T1 known, calculate To, T2, T3, etc. and determine corresponding flash tank pressures (Ps in pounds per square inch) from the steam tables. For example, with Tr=220 C: T3=192, P3=188, T2=153, P2=74, more or less.

Although optimization of the operating parameters in the practice of the present invention provides additional economic and other benefits, the techniques of the present invention provide more fundamental benefits which can be readily appreciated. Because little use is made of chemical additives in the processes of the present invention, waste disposal problems are minimized. Furthermore, the effluent wash water liquor includes lignin, oligomers and monomers from hemicellulose and extractives that are relatively free of toxic degradation products and may be further processed for their economic values. In addition, energy recuperation is achieved through use of heat transfer between output and input streams to minimize the cost of heating wash water.

While the processes herein described and the forms of apparatus for carrying these processes into effect constitute preferred embodiments of this invention, it is to be understood that the invention is not limited to these precise processes and forms of apparatus and that changes may be made in either without departing from the scope of the invention which is defined in the appended claims.

What is claimed is:

1. A method of treating lignocellulosic biomass to produce purified cellulose containing less than 20% lignin, said method comprising the steps of:

providing a lignocellulosic feedstock having an average constituent thickness of at most 1";

introducing said feedstock into a pressure vessel having at least two reaction zones;

maintaining said feedstock in the pressure vessel for a residence time;

heating said feedstock in a first reaction zone to a temperature of from about 180° C. to about 240° C. to dissolve hemicellulose;

removing said dissolved hemicellulose from the heated feedstock transferring said heated feedstock from said first reaction zone to a second reaction zone;

subjecting said transferring feedstock to a counterflow of hot wash water of pH of from about 8 pH to about 13 pH to create residual solids containing cellulose and a wash water containing dissolved materials; and separating the residual solids containing purified cellulose from the filtered wash water, wherein said separated cellulose contains less than 20% lignin.

2. The method of treating lignocellulosic biomass according to claim 1 wherein the residence time of the solids in the pressure vessel is from 1 to 10 minutes and the average constituent thickness is at most ⅛".

3. The method of treating lignocellulosic biomass according to claim 2 wherein the transferring step further includes the step of:

operating an auger at a predetermined rate.

4. The method of claim 3 further comprising the steps of:

operating the auger to perform at least one function selected from the group of functions consisting of kneading, stirring and compressing the transferring feedstock and thereby facilitating reaction processes.

5. The method of treating lignocellulosic biomass according to claim 1 wherein the method further comprises the steps of:

injecting water into the second reaction zone to rinse the residual solid containing cellulose to produce a rinsed cellulose product; and discharging the rinsed cellulose product.

6. The method of treating lignocellulosic biomass according to claim 1 wherein the method further comprises the steps of:

adding an alkali reagent into at least one reaction zone to maintain the pH in the range of from 8 to 13.

7. The method of treating lignocellulosic biomass according to claim 6 wherein the alkali reagent includes lime.

8. The method of treating lignocellulosic biomass according to claim 1 wherein the method further comprises the step of:

adding an oxidizer to at least one reaction zone to decompose solid or dissolved material.

9. The method of treating lignocellulosic biomass according to claim 8 further comprising the step of:

adding to at least one reaction zone a chemical agent selected from the group consisting of hydrogen peroxide, oxygen, air, chlorine dioxide and ozone.

10. The method of treating lignocellulosic biomass according to claim 1 wherein the method further comprises the steps of:

filtering the wash water with a filtration means; and cleaning and scouring the filtration means by operation of the transferring feedstock step to prevent clogging.

11. The method of treating lignocellulosic biomass according to claim 1 wherein the method further comprises the step of:

injecting steam for heating into at least one reaction zone to create temperature differences between the at least two reaction zones.

12. The method of treating lignocellulosic biomass according to claim 1 wherein the pressure vessel includes a plurality of ports for the injection and discharge of wash liquid and the method further comprises the step of:

selectively removing soluble components of the transferred feed stock.

13. The method of treating lignocellulosic biomass according to claim 1 wherein the method further comprises the step of:

preheating the feedstock with flash steam from the discharge of cellulose solids.

14. The method of treating lignocellulosic biomass according to claim 1 wherein the method further comprises the step of:

heating input wash water to operating temperature by steam injection.

15. The method of treating lignocellulosic biomass according to claim 14, further comprising the step of:

using a final flash steam condensate in a liquid-liquid heat exchanger for initial preheat of the fresh wash water.

16. The method of treating lignocellulosic biomass according to claim 1 wherein the method further comprises the steps of:

providing input wash water;

obtaining effluent wash water; and preheating the input wash water by heat exchange from the effluent wash water.

17. The method of treating lignocellulosic biomass according to claim 16 wherein the method further comprises the step of:

incorporating a multistage heat exchange process with stepwise reduction of pressure from the pressurized reaction vessel to atmospheric pressure, each stage having the steps of:
(a) discharging pressurized wash water through a control nozzle into a flash tank;
(b) conveying flash steam from said flash tank to a heat exchanger;
(c) condensing said flash steam to release heat; and
(d) transferring said heat to preheat said input wash water.

18. The method of treating lignocellulosic biomass according to claim 17, wherein the multistage process includes at least 3 stages of pressure reduction.

19. The method of treating lignocellulosic biomass according to claim. 17, further comprising the steps of:
(a) measuring temperatures and pressures in flash tanks and heat exchangers to produce temperature and pressure data;
(b) processing temperature and pressure data to provide control signals; and
(c) actuating variable nozzles controlling liquid flow into flash tanks based upon the control signals.

20. The method of treating lignocellulosic biomass according to claim 16, further comprising the step of:

removing entrained, non-condensible gases from effluent wash water before the heat exchange step.

21. The method of treating lignocellulosic biomass according to claim 1 further comprising the steps of:

acidifying flash liquor from one or more flash tanks at elevated pressure and temperature; and providing holdup time sufficient for hemicellulose oligomers to decompose to monomers.

22. The method of treating lignocellulosic biomass according to claim 20 wherein the acidifying step includes the step of:

employing pressurized carbon dioxide as an acidifying agent.

23. A method of treating lignocellulosic biomass containing lignin to produce purified cellulose, said method comprising:

providing a lignocellulosic feedstock;

introducing said feedstock into a pressure vessel having at least two reaction zones;

heating said feedstock in a first reaction zone to a temperature of from about 180° C. to about 240° C;

removing hydrolized hemicellulose from the heated feedstock;

transferring said heated feedstock from said first reaction zone to a second reaction zone;.

subjecting said feedstock in said second zone to a counterflow of hot wash water containing dissolved oxygen and having a pH of at least 11 to produce residual solids containing cellulose and a wash water containing lignin and other extractives; and separating the residual solids containing purified cellulose from the filtered wash water, wherein the separated cellulose contains less than 20% lignin.

* * * * *